(12) United States Patent
Duan

(10) Patent No.: US 10,778,059 B2
(45) Date of Patent: Sep. 15, 2020

(54) METHOD OF ENCAPSULATING MOTOR WINDINGS OF ELECTRICAL SUBMERSIBLE PUMP IN BONDED CERAMIC

(71) Applicant: Baker Hughes, a GE Company, LLC, Houston, TX (US)

(72) Inventor: Ping Duan, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 314 days.

(21) Appl. No.: 15/974,929

(22) Filed: May 9, 2018

(65) Prior Publication Data

US 2018/0262074 A1    Sep. 13, 2018

Related U.S. Application Data

(63) Continuation of application No. 15/075,359, filed on Mar. 21, 2016, now abandoned.

(Continued)

(51) Int. Cl.
| | |
|---|---|
| *H02K 3/34* | (2006.01) |
| *E21B 1/00* | (2006.01) |
| *F04B 47/06* | (2006.01) |
| *H02K 3/02* | (2006.01) |
| *H02K 3/50* | (2006.01) |
| *H02K 5/132* | (2006.01) |

(Continued)

(52) U.S. Cl.
CPC ............... *H02K 3/345* (2013.01); *E21B 1/00* (2013.01); *E21B 43/128* (2013.01); *F04B 47/06* (2013.01); *H02K 3/02* (2013.01); *H02K 3/50* (2013.01); *H02K 5/132* (2013.01); *H02K 15/105* (2013.01); *H02K 3/30* (2013.01); *H02K 9/22* (2013.01); *Y10T 29/49009* (2015.01)

(58) Field of Classification Search
CPC .. H02K 3/02; H02K 3/12; H02K 3/30; H02K 3/345; H02K 3/44; H02K 3/46; H02K 3/48; H02K 3/50; H02K 5/132; H02K 9/22; H02K 15/105; H02K 15/12; H02K 15/125; Y10T 29/49009; Y10T 29/49073; F04B 47/06; E21B 43/128
See application file for complete search history.

(56) References Cited

U.S. PATENT DOCUMENTS 3,710,437 A * 1/1973 Kipple ................... H02K 15/12
29/596
6,969,940 B2  11/2005 Dalrymple
(Continued)

*Primary Examiner* — Peter Dungba Vo
*Assistant Examiner* — Joshua D Anderson
(74) *Attorney, Agent, or Firm* — Bracewell LLP; James E. Bradley

(57) ABSTRACT

An electrical submersible pump assembly has a motor with a stator stack of limitations. The stack has slots through which magnet wires are wound. An encapsulate surrounds and bonds the magnet wires together within each slot. The encapsulate includes ceramic particles within a polymer adhesive matrix. The polymer matrix may be a fluoropolymer adhesive. Each of the magnet wires may have an electrical insulation layer surrounding a copper core. The ceramic particles are rounded and much smaller than a cross-sectional area of each of the magnet wires. At least some of the magnet wires may be in contact with a perimeter of the slot. The ceramic particles may be porous.

20 Claims, 3 Drawing Sheets

Related U.S. Application Data

(60) Provisional application No. 62/140,977, filed on Mar. 31, 2015.

(51) Int. Cl.
    *H02K 3/30*     (2006.01)
    *H02K 9/22*     (2006.01)
    *E21B 43/12*     (2006.01)
    *H02K 15/10*     (2006.01)

(56) References Cited

U.S. PATENT DOCUMENTS

| | | |
|---|---|---|
| 7,587,807 B2 | 9/2009 | Bourqui et al. |
| 7,679,242 B2 | 3/2010 | Parmeter |
| 8,113,273 B2 | 2/2012 | Manke |
| 8,604,656 B2 | 12/2013 | Goertzen |
| 8,664,817 B2 | 3/2014 | Rumbaugh |
| 8,772,997 B2 | 7/2014 | Rumbaugh |
| 2004/0056537 A1 | 3/2004 | Du et al. |
| 2004/0056538 A1 | 3/2004 | Du et al. |
| 2007/0142547 A1 | 6/2007 | Vaidya et al. |
| 2009/0317264 A1 | 12/2009 | Manke |
| 2012/0275542 A1 | 11/2012 | Khojastepour |
| 2013/0153260 A1 | 6/2013 | Favereau |
| 2013/0154431 A1 | 6/2013 | Knapp |
| 2014/0028119 A1 | 1/2014 | Sagalovskiiy et al. |
| 2016/0036277 A1 | 2/2016 | Lynch et al. |
| 2016/0294243 A1 | 10/2016 | Duan |

\* cited by examiner

METHOD OF ENCAPSULATING MOTOR WINDINGS OF ELECTRICAL SUBMERSIBLE PUMP IN BONDED CERAMIC

CROSS REFERENCE TO RELATED APPLICATION

This application is a continuation of application Ser. No. 15/075,359, filed Mar. 21, 2016, which claims priority to provisional application Ser. No. 62/140,977, filed Mar. 31, 2015.

FIELD

The present disclosure relates to downhole pumping systems submersible in well bore fluids. More specifically, the present disclosure relates to a method of encapsulating motor windings of an electrical submersible pump motor in a composition of ceramic and polymer.

BACKGROUND

Submersible pumping systems are often used in hydrocarbon producing wells for pumping fluids from within the well bore to the surface. These fluids are generally liquids made up of produced liquid hydrocarbon and often water. One type of system used in this application employs an electrical submersible pump ("ESP"). ESP's are typically disposed at the end of a length of production tubing and have an electrically powered motor. Often, electrical power may be supplied to the pump motor via an electrical power cable from the surface that is strapped alongside the tubing.

ESP motors have stators with axially oriented slots and insulated magnet wires wound through the slots in a selected pattern. A sheet of an insulation material is usually wrapped around each bundle of magnet wires within each of the slots. The magnet wires extend below a lower end of the stator in loops spaced around a longitudinal axis of the motor. The magnet wires may be bonded in the slots with an epoxy resin to resist mechanical vibration during operation. In one technique, magnet wire leads are spliced to upper ends of three of the magnet wires. The magnet wire leads extend from the upper end of the stator to internal contacts in a motor electrical plug-in receptacle. A dielectric lubricant fills the motor for lubricating bearings within the motor.

Typically, the pumping unit is disposed within the well bore just above where perforations are made into a hydrocarbon producing zone. In this position the produced fluids flow past the outer surface of the pumping motor and absorb heat generated by the motor. In spite of the heat transfer between the fluid and the motor, the motor may still overheat. Overheating may be a problem when the fluid has a high viscosity, a low specific heat, or a low thermal conductivity. This is typical of highly viscous crude oils. Also, the motor may be forced to operate at an elevated temperature past its normal operating temperature in steam injection wells. Elevated well temperatures can reduce motor life. Undesirable chemicals may be formed when the epoxy resin degrades under high temperature. These chemicals can damage the insulation layers of the magnet wires.

SUMMARY

A method of manufacturing a motor of an electrical submersible pumping ("ESP") assembly comprises assembling a stack of stator laminations in a motor housing, the stator laminations having slots formed therethrough. Magnet wires are wound through the slots. Ceramic particles are mixed with a polymer matrix powder to form a dry mixture. The dry mixture is distributed into spaces in the slots between and around the magnet wires. The stack of stator laminations is heated melt the polymer matrix powder. After cooling, the polymer matrix powder bonds the ceramic particles to each other and to the magnet wires.

The method may also include orienting the motor housing with an upper end at an elevation above a lower end of the motor housing. Then the dry mixture I poured into the upper end of the motor housing. The method may also include vibrating the motor housing while pouring the dry mixture into the upper end of the motor housing.

In one embodiment, the polymer matrix powder comprises a fluoropolymer. The ceramic particles may have a size of 20 mesh to 140 mesh (105 microns to 840 microns). The polymer matrix powder may have a size in a range from 20 to 200 microns. In one embodiment, mixing the ceramic particles and the polymer matrix powder involves mixing more parts of ceramic particles than polymer matrix powder.

Heating the stack of stator laminations may comprise placing the motor housing in an oven. Nitrogen gas may be circulated through the motor housing while being heated in the oven.

In the embodiment shown, the polymer matrix powder comprises a fluoropolymer that is selected from a group consisting of perfluoroalkoxy ("PFA") and fluorinated ethylene propylene ("FEP").

BRIEF DESCRIPTION OF DRAWINGS

Some of the features and benefits of the present invention having been stated, others will become apparent as the description proceeds when taken in conjunction with the accompanying drawings, in which.

Figure 1:
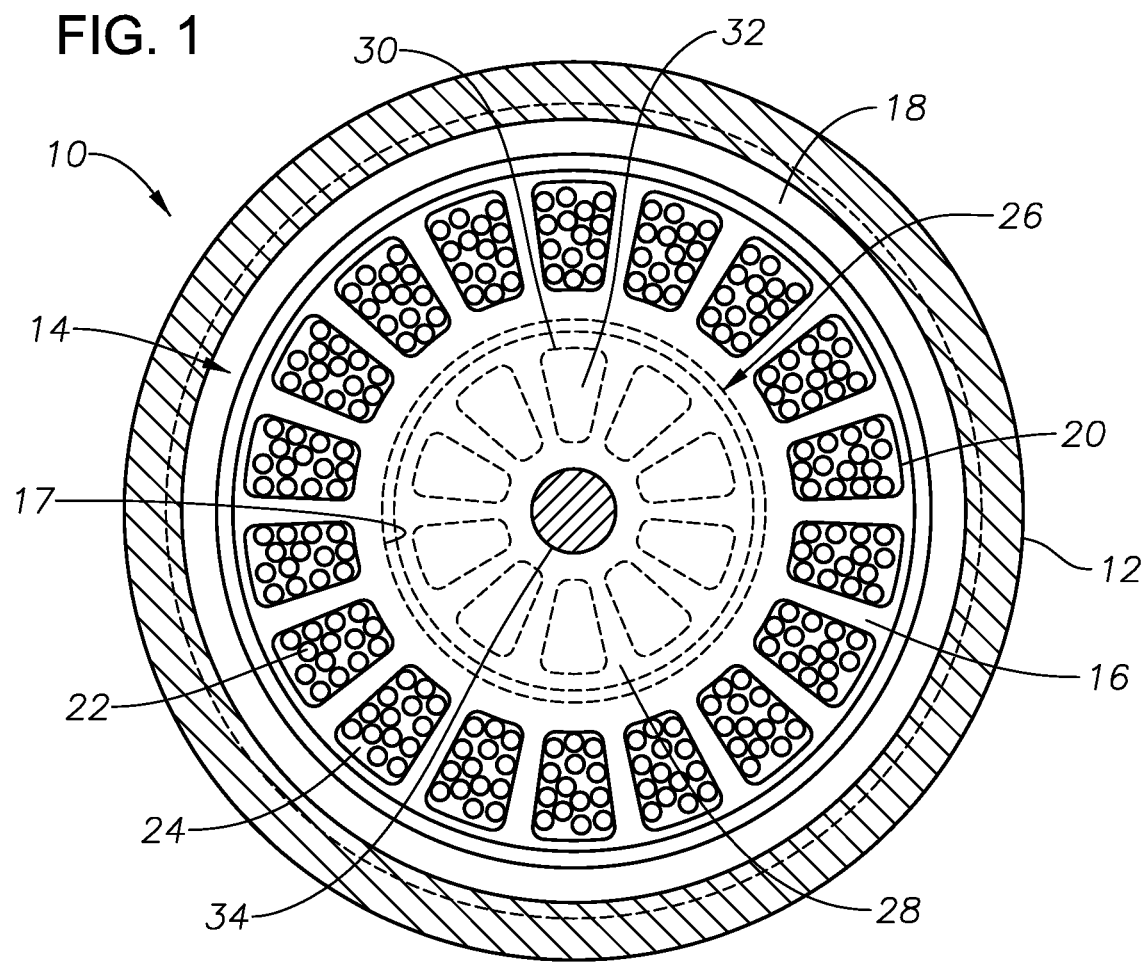
FIG. 1 is a transverse cross sectional view of a motor for use with an electrical submersible pumping system, the motor being constructed in accordance with this disclosure.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows an axial partial sectional view of an upper end of a motor 10 for use with an electrical submersible pumping system ("ESP"). The motor 10 is equipped with a generally cylindrical housing 12 which covers and protects components of the motor 10 against harsh downhole conditions, and provides an external support in which the components are contained. Motor 10 will typically be filled with a liquid dielectric motor lubricant. Illustrated within housing 12 is a stator assembly 14, which includes a stator stack 16 made up of a series of laminations that are coaxially stacked together. Each lamination is a typically a thin, steel disc. The laminations of stator stack 16 have central openings 17 that define a bore of stator assembly 14. An annular ring 18 shown set on an upper surface of stator stack 16 has an inner diameter less than an outer diameter of stator stack 16 and retains stack 16 within housing 12.

Figure 2:
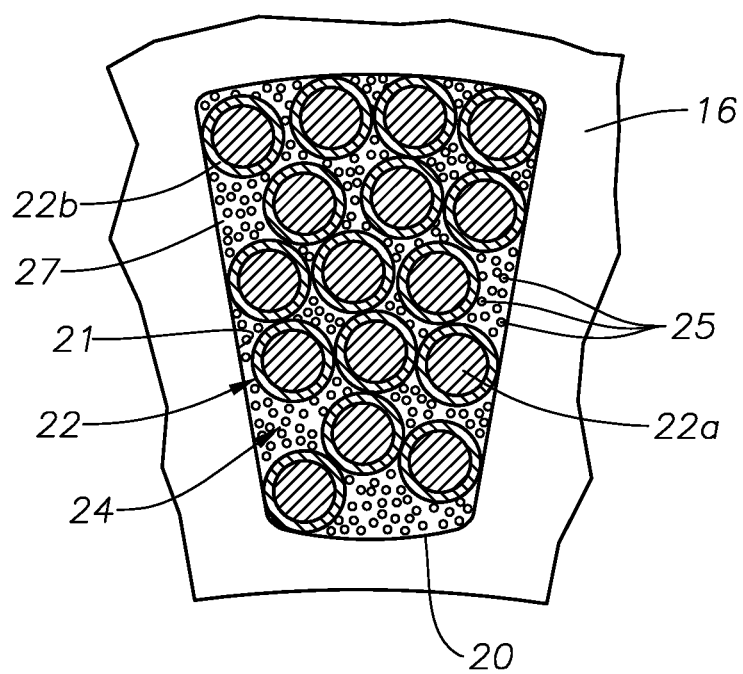
FIG. 2 is an enlarged view of one of the stator slots of the motor of FIG. 1, schematically illustrating an encapsulate in the slot having ceramic particles dispersed within a polymer matrix.

A series of slots 20 are formed axially through each of the laminations in stack 16 and which extend along a length of stack 16. Slots 20 as shown are formed equidistant apart from one another, extending circumferentially around the bore of the stator stack 16. Referring to FIG. 2, each slot 20 has a perimeter 21 that may be generally trapezoidal in shape, as shown. An opening (not shown) may lead from each slot 20 to central opening 17. Alternately, each slot 20 may be completely enclosed by its perimeter 21.

A number of motor or magnet wires 22 are wound along the length of each of the slots 20. Normally, motor 10 (FIG. 1) is a three-phase motor and will have three separate magnet wires 22. Each magnet wire 22 extends the length of stator assembly 14 and has multiple turns within each slot 20. Preferably, each magnet wire 22 has a metal core 22a, normally copper, that is encased in a high temperature electrical insulation layer 22b.

An encapsulate 24 surrounds and rigidly bonds the magnet wires 22 together within each slot 20 and forms a protective coating around the magnet wires 22. In this embodiment, there is no liner surrounding the bundle of magnet wires 22 in each slot 20; rather encapsulate 24 and magnet wires 22 completely fill each slot 20. Part of encapsulate 24 will be bonded to and in contact with perimeter 21 of each slot 20. Also, some of the magnet wires 22 will be in contact with slot perimeter 21.

Encapsulate 24 is made up of a mixture of ceramic particles 25 bonded together by a polymer matrix 27. Ceramic particles 25 are dispersed throughout polymer matrix 27. Ceramic particles 25 are formed of a hard material with high electrical insulation properties. Ceramic particles 25 may be porous to the dielectric motor lubricant contained within motor 10 so as to increase the rate of heat transfer from motor 10.

Ceramic particles 25 have cross-sectional dimensions much smaller than the cross-sectional dimension of each magnet wire 22. For example, ceramic particles 25 may be in a particle range size from about 20 mesh to about 140 mesh (105 microns to 840 microns). In one optional embodiment, ceramic particles 25 are generally rounded or spherical and do not have sharp edges. The rounded shape of the ceramic particles 25 reduces the chances for damaging magnet wire insulation layers 22b.

Ceramic particles 25 may comprise proppants or microspheres, such as those used for downhole gravel packing having a trade name of Carboaccucast®, and which may be commercially available from the Carbo Corporation, 575 N. Dairy Ashford Rd, Suite 300, Houston, Tex., 77079, (281) 921 6400. In a non-limiting example, ceramic particles 25 may comprise Carboaccucast® ID50 having a particle size of from about 50 mesh to about 100 mesh (149 microns-297 microns). Alternate embodiments exist wherein ceramic particles 25 comprise alumina (99.9% Al2O3), aluminum silicate, Al2SiO5, berillia (99% BeO), boron nitride, BN, cordierite, Mg2Al4Si5O18, forsterite, mg2SiO4, porcelain, steatite, Mg3Si4O11.H2O, titanates of Mg, Ca, Sr, Ba, and Pb, barium titanate, glass bonded, zirconia, ZrO2, fused silica, SiO2, micas, muscovite, ruby, natural, phlogopite, amber, natural, fluorophlogopite, synthetic, glass-bonded mica, and combinations thereof.

Polymer matrix 27 is formed of a polymer adhesive that heat cures after filling each slot 20. Example polymer adhesives for polymer matrix 27 include fluoropolymers. Example fluoropolymers for polymer matrix 27 include perfluoroalkoxy alkanes ("PFA"), fluorinated ethylene propylene ("FEP"), and polytetrafluoroethylene ("PTFE"). Preferably, polymer matrix 27 has good chemical resistance properties at elevated temperatures. Elevated temperatures are those that can typically occur downhole, and may be those that exceed about 150° F.

One method of manufacturing polymer matrix 27 employs a fluoropolymer supplied as a powder that has a particle size ranging from about 20 microns to about 200 microns. In a non-limiting example, polymer matrix 27 may include a fluoro-polymer powdered binder NC-1500 available from Daikin Chemicals, 20 Olympic Drive Orangeburg, N.Y. 10962, http://www.daikin-america.com/, and which is a thermal-fusible FEP based fine powder having a particle size of from about 30 microns to about 60 microns.

Referring again to FIG. 1, a rotor assembly 26 is shown circumscribed by stator assembly 14, where the rotor assembly 26 rotates with respect to stator assembly 14. Rotor assembly 26 includes several rotor stacks 28 (only one shown) axially separated from each other by radial bearings. Rotor stack 28, similar to stator stack 16, is made up of a number of rotor laminations or steel discs that are stacked on top of one another in a coaxial arrangement. Slots 30 are formed axially through each of the rotor laminations, so that when the laminations are stacked, the slots 30 extend through the entire length of the rotor stack 28. Slots 30 are shown substantially equidistant apart from one another at multiple angular locations around the rotor stack 28. Elongate rotor bars 32 are set in slots 30, wherein in one example the rotor bars 32 include a magnetic material. Thus, in one example, energizing the magnet wires 22 with an electrical current creates an alternating electromagnetic field (not shown). The rotor bars 32 are responsive to the electromagnetic field thereby causing rotation of the rotor assembly 26. Coaxial within the rotor assembly 26 is an elongate shaft 34 that couples to and rotates with the rotor assembly 26.

In one non-limiting example, the mixture of ceramic particles 25 and polymer powder for polymer matrix 27 includes about 100 parts of ceramic particles 25 and about 30 parts of polymer matrix 27 powder. Ceramic particles 25 may have a size of about 50 mesh to about 100 mesh, and the powder for polymer matrix 27 may have a particle size of about 30 microns to about 60 microns. Yet further optionally, the polymer matrix 27 may include a chemical resistant fluoro-polymeric powder, such as FEP. Further optionally in this example, new stainless steel components are installed in the stator and end attachments, and the slots 20 in the stator stack 16 are filled with the mixture of ceramic particles 25 and powder for polymer matrix 27.

Figure 3:
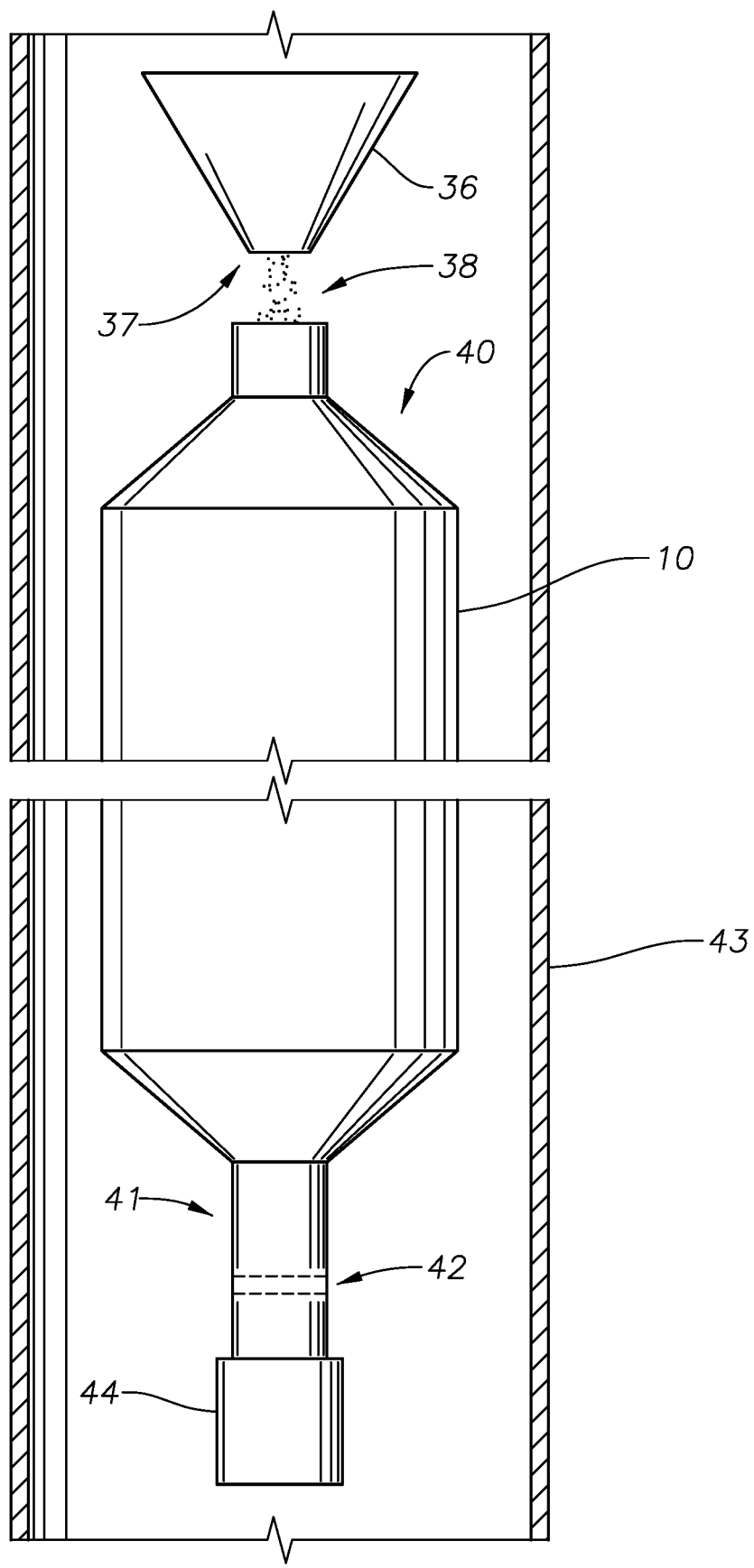
FIG. 3 is a side perspective view of an example of a method of encapsulating magnet wires in the motor of FIGS. 1 and 2.

Schematically illustrated in FIG. 3 is one example of how the encapsulate 24 of FIGS. 1 and 2 can be formed within slots 20. As shown, a mixture 38 of ceramic particles 25 and powdered polymer matrix 27 is combined within a container 36 having an outlet 37. Mixture 38 exits the outlet 37 and enters a shroud 40 that is set over the upper end of motor 10. At the opposite end of motor 10 is a vacuum system 41 that draws air from within the motor 10, and thus the slots 20 (FIGS. 1 and 2), thereby drawing in mixture 38 to fill all voids and interstices that may exist between the magnet wires 22 in the slots 20 (FIGS. 1 and 2). Optionally, a filter 42 may be within vacuum system 41 for blocking ceramic particles 25 or the powders of polymer matrix 27 from exiting the lower end of vacuum system 41. In one embodiment, filter 42 comprises a 100 mesh steel screen for capturing ceramic particles 25 and polymer matrix 27 powders that may make their way through the entire length of motor 10. In one alternative, a vacuum pump 44 is included on the lower end of vacuum system 41, wherein a hose connects vacuum pump 44 to the lower end of pump 10 so that the vacuum pump 44 can apply suction to the lower end of the slots 20. A mechanical shaker (not shown), can be used to further ensure mixture 38 fills any remaining voids in the slots 20.

After mixture 38 of ceramic particles 25 and polymer matrix 27 powders fill slots 20 around magnet wires 22, mixture 38 can be heated. The heating may be done either by heating the entire motor 10 or by conducting electricity through magnet wires 22 for heating the mixture 38. In one example, a melting point of the powders of polymer matrix 27 is about 260° C. to about 350° C.; thus the mixture 38 is heated to at least this temperature, thereby melting the powders of polymer matrix 27. The heating and subsequent cooling causes bonding of ceramic particles 25 within polymer matrix 27 to magnet wires 22, forming a solid, rigid encapsulate 24 within slots 20 for protecting wires 22. The heating does not affect ceramic particles 25.

Optionally, heating of the entire motor 10 can take place within a high temperature tubular oven 43. In a non-limiting example, the motor 10 is heated for a period of time up to about 5 hours, and the upper and lower openings of slots 20 are plugged to retain mixture 38 in the slots 20. Yet further optionally, a nitrogen blanket is applied to the motor 10 to remove volatiles released during heating. Melting, then cooling the polymer matrix 27 powders forms an integrated tough structural bonding material that secures the magnet wires 22 in place within slots 20. As indicated above, the presence of ceramic particles 25 within the encapsulate 24 creates a porosity for encapsulate 24, which increases heat transfer away from motor.

Figure 4:
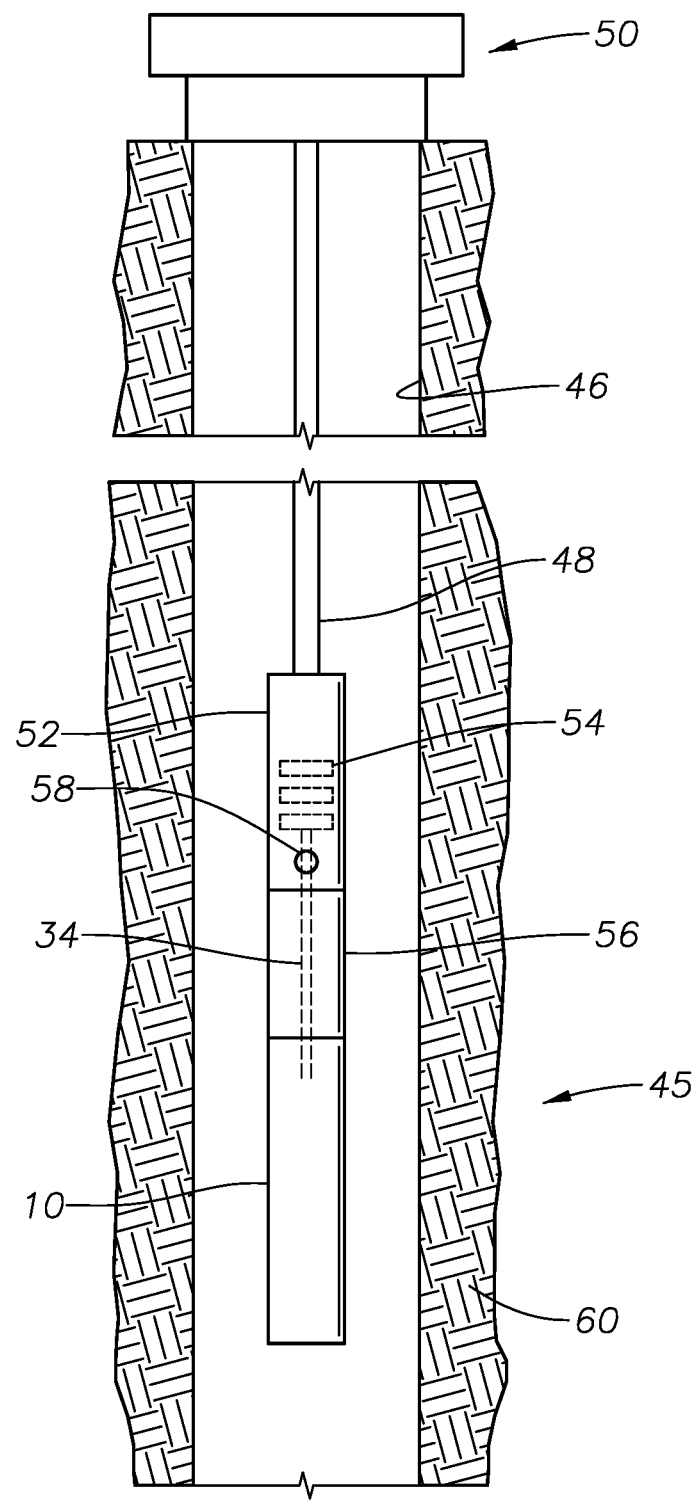
FIG. 4 is a side partial sectional view of the motor of FIG. 1 integrated with an electrical submersible pumping system and disposed in a wellbore.

Shown in partial side sectional view in FIG. 4 is one example of the motor 10 used in conjunction with an electrical submersible pump (ESP) system or assembly 45. Here the ESP system 45 is disposed in a wellbore 46 on a lower end of a string of production tubing 48. An upper end of production tubing 48 connects to a wellhead assembly 50, shown capping an upper end of wellbore 46. Motor 10 couples to a pump 58, which is shown provided on an upper end of ESP system 45. Shaft 34 connects to impellers 54 (shown in phantom view) within pump 58. Pump 58 pumps well fluid from within wellbore 46 so it may be discharged to the production tubing 48 and pumped to the wellhead assembly 50. A seal section 56 is provided between the pump 52 and motor 10 for equalizing pressure within the ESP system 45 with the hydrostatic pressure of well fluid in wellbore 46. An intake 58 is shown formed through a housing of the pump 52 so that fluid within wellbore 46 can make its way to the impellers 54 for pressurization and delivery to production tubing 48. In this example, the fluids pressurized by the ESP system 45 are produced from a formation 60 that is intersected by the wellbore 46.

The present invention described herein is well adapted to carry out the objects and attain the ends and advantages mentioned, as well as others inherent therein. The chemically inert encapsulation of the motor wires replaces chemically instable epoxy resin. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A method of manufacturing a motor for an electrical submersible pumping assembly, comprising:
   assembling a stack of stator laminations in a motor housing, the stack of stator laminations having slots formed therethrough;
   winding magnet wires through the slots;
   mixing ceramic particles with polymer matrix powder to form a dry mixture;
   elevating an upperend of the motor housing above a lowerend of the motor housing;
   pouring the dry mixture into the upper end of the motor housing and down into spaces in the slots between and around the magnet wires; then
   heating the stack of stator laminations to melt the polymer matrix between and around the magnet wires; then
   cooling the stack of stator laminations causing the melted polymer matrix to bond the ceramic particles to each other and to the magnet wires; then
   installing a rotor within the stack of stator laminations and filling the motor housing with a dielectric lubricant to form the motor for the electrical submersible pumping assembly.

2. The method according to claim 1, further comprising:
   vibrating the motor housing while pouring the dry mixture into the upper end of the motor housing.

3. The method according to claim 1, wherein the polymer matrix powder comprises a fluoropolymer.

4. The method according to claim 1, wherein the ceramic particles have a size of 20 mesh to 140 mesh (105 microns to 840 microns).

5. The method according to claim 1, wherein the polymer matrix powder has a size in a range from 20 to 200 microns.

6. The method according to claim 1, wherein mixing the ceramic particles with the polymer matrix powder comprises using more parts of the ceramic particles than the polymer matrix powder.

7. The method according to claim 1, wherein heating the stack of stator laminations comprises placing the motor housing in an oven.

8. The method according to claim 7, further comprising circulating a gas through the motor housing while the motor housing is being heated in the oven to remove volatiles released during heating.

9. The method according to claim 1, wherein the polymer matrix powder comprises a fluoropolymer that is selected from a group consisting of perfluoroalkoxy ("PFA") and fluorinated ethylene propylene ("FEP").

10. A method of manufacturing a motor for an electrical submersible pumping assembly, comprising:
    assembling a stack of stator laminations in a motor housing, the stack of stator laminations having slots formed therethrough;
    winding magnet wires through the slots;
    mixing rounded, porous ceramic particles with a fluoropolymer matrix powder to form a dry mixture;
    elevating an upperend of the motor housing above a lowerend of the motor housing;
    pouring the dry mixture into the upper end of the motor housing and down into spaces in the slots between and around the magnet wires;
    heating the stack of stator laminations to a temperature sufficient to melt the polymer matrix powder between and around the magnet wires; then
    cooling the stack of stator laminations causing the melted polymer matrix to form a rigid encapsulate in the slots around the magnet wires; then
    installing a rotor within the stack of stator laminations and filling the motor housing with a dielectric lubricant to form the motor for the electrical submersible pumping assembly; and
    infiltrating a portion of the dielectric lubricant into the ceramic particles to enhance heat transfer while the motor is operating.

11. The method according to claim 10, wherein pouring the dry mixture down the spaces in the slots further comprises vibrating the motor housing.

12. The method according to claim 10, wherein the fluoropolymer matrix powder is selected from a group consisting of perfluoroalkoxy ("PFA") and fluorinated ethylene propylene ("FEP").

13. The method according to claim 10, wherein mixing the ceramic particles with the fluoropolymer matrix powder comprises mixing more parts of the ceramic particles than the fluoropolymer matrix powder.

14. The method according to claim 10, wherein:
    the ceramic particles have a size of 20 mesh to 140 mesh (105 microns to 840 microns); and
    the fluoropolymer matrix powder has a size in a range from 20 to 200 microns.

15. A method of manufacturing a motor of an electrical submersible pumping ("ESP") assembly, comprising:
    assembling a stack of stator laminations in a motor housing, the stack of stator laminations having slots formed therethrough;
    winding magnet wires through the slots;
    mixing more parts of rounded, porous ceramic particles to a less parts of a fluoropolymer matrix powder to form a dry mixture;
    elevating an upperend of the motor housing above a lowerend of the motor housing;
    pouring the dry mixture into the upper end of the motor housing and down into spaces in the slots between and around the magnet wires;
    heating the stack of stator laminations to a temperature sufficient to melt the fluoropolymer matrix powder contained between and around the magnet wires; then
    cooling the stack of stator laminations causing the melted polymer matrix to form a rigid encapsulate in the slots around the magnet wires; then
    installing a rotor within the stack of stator laminations and filling the motor housing with a dielectric lubricant to form the motor for the electrical submersible pumping assembly; and
    infiltrating a portion of the dielectric lubricant into the ceramic particles to enhance heat transfer while the motor is operating.

16. The method according to claim 15, wherein pouring the dry mixture down the spaces in the slots further comprises:
    vibrating the motor housing.

17. The method according to claim 15, wherein heating the stack of stator laminations comprises heating the motor housing in an oven.

18. The method according to claim 17, further comprising:
    circulating nitrogen gas through the motor housing while it is being heated.

19. The method according to claim 15, wherein each of the slots has a perimeter; and
    at least some of the magnet wires are in contact with the perimeter and at least some of the encapsulate is in contact with the perimeter.

20. The method according to claim 15, wherein the ceramic particles are spherical.

* * * * *

UNITED STATES PATENT AND TRADEMARK OFFICE
CERTIFICATE OF CORRECTION

PATENT NO. : 10,778,059 B2
APPLICATION NO. : 15/974929
DATED : September 15, 2020
INVENTOR(S) : Ping Duan It is certified that error appears in the above-identified patent and that said Letters Patent is hereby corrected as shown below:

On the Title Page

Item (57) In the Abstract, Line 25, reads: "a stator stack of limitations. The stack has slots through"
It should read: --a stator stack of laminations. The stack has slots through--;

In the Specification

Column 2, Line 6, reads: "laminations is heated melt the polymer matrix powder. After"
It should read: --laminations is heated to melt the polymer matrix powder. After--;

Column 2, Line 11, reads: "motor housing. Then the dry mixture I poured into the upper"
It should read: --motor housing. Then the dry mixture is poured into the upper--;

In the Claims

In Claim 1, Column 6, Line 36, reads: "elevating an upperend of the motor housing above a"
It should read: --elevating an upper end of the motor housing above a--;

In Claim 1, Column 6, Line 37, reads: "lowerend of the motor housing;"
It should read: --lower end of the motor housing;--;

In Claim 10, Column 7, Line 17, reads: "elevating an upperend of the motor housing above a"
It should read: --elevating an upper end of the motor housing above a--;

In Claim 10, Column 7, Line 18, reads: "lowerend of the motor housing;"
It should read: --lower end of the motor housing;--;

In Claim 15, Column 8, Line 12, reads: "elevating an upperend of the motor housing above a"
It should read: --elevating an upper end of the motor housing above a--; and Signed and Sealed this
Third Day of August, 2021

Drew Hirshfeld
*Performing the Functions and Duties of the*
*Under Secretary of Commerce for Intellectual Property and*
*Director of the United States Patent and Trademark Office*

In Claim 15, Column 8, Line 13, reads: "lowerend of the motor housing;"
It should read: --lower end of the motor housing;--.